United States Patent [19]
Tang et al.

[11] Patent Number: 5,799,689
[45] Date of Patent: Sep. 1, 1998

[54] TUBULAR REFRIGERANT CHECK VALVE WITH IDENTED OUTER HOUSING PORTION

[75] Inventors: Punan Tang, Fort Smith; Diane M. Jakobs, Alma, both of Ark.

[73] Assignee: Rheem Manufacturing Company, New York, N.Y.

[21] Appl. No.: 814,926

[22] Filed: Mar. 12, 1997

[51] Int. Cl.$^6$ ........................... F16K 15/00
[52] U.S. Cl. ............ 137/533.13; 137/533.15; 137/515
[58] Field of Search ............ 137/533.11, 533.13, 137/533.15, 533.19, 515; 251/368

[56] References Cited

U.S. PATENT DOCUMENTS

| | | | |
|---|---|---|---|
| 720,100 | 2/1903 | Bashlin. | |
| 1,353,303 | 9/1920 | Adams. | |
| 1,572,858 | 2/1926 | Halsey. | |
| 2,682,281 | 6/1954 | Ecker | 137/533.13 |
| 2,723,679 | 11/1955 | Harris et al. | 137/533.13 |
| 3,387,625 | 6/1968 | Laure | 137/543.19 |
| 3,620,228 | 11/1971 | Schmid | 137/533.11 |
| 3,797,521 | 3/1974 | King | 137/533.11 |
| 3,955,542 | 5/1976 | Skaggs | 137/515 |
| 4,018,247 | 4/1977 | Carr | 137/512.1 |
| 4,071,045 | 1/1978 | Brandt | 137/528 |
| 4,100,935 | 7/1978 | Harnish | 137/533.11 |
| 4,224,961 | 9/1980 | Schnabel | 137/533.11 |
| 4,286,622 | 9/1981 | Ninomiya et al. | 137/533.11 |
| 4,543,986 | 10/1985 | Byrne | 137/533.11 |
| 4,568,337 | 2/1986 | Treharne, III et al. | 137/533.11 |
| 4,601,305 | 7/1986 | Nordskog | 137/528 |
| 4,633,681 | 1/1987 | Webber | 62/511 |
| 5,044,391 | 9/1991 | Brumfield | 137/533.11 |
| 5,046,526 | 9/1991 | Longmore et al. | 137/515.5 |
| 5,653,258 | 8/1997 | Schwarz | 137/533.11 |

*Primary Examiner*—Denise L. Ferensic
*Assistant Examiner*—Joanne Y. Kim
*Attorney, Agent, or Firm*—Konneker & Smith, P.C.

[57] ABSTRACT

A check valve connectable in a refrigerant line is economically fabricated from only three parts—(1) a copper tubing body connectable in the refrigerant line, (2) a nonmetallic shutoff ball, and (3) an annular valve seat member having a conically tapered seating surface on one of its ends. The seat member is coaxially received within a first end of a longitudinally central portion of the tubing positioned between spun-down opposite end portions thereof, with the seating surface end of the seat member facing the second end of the central tubing portion, and the ball being received in the central tubing portion for axial movement into and out of sealing engagement with the seating surface. Three circumferentially spaced, axially elongated side wall indentations are formed in the central tubing portion. The indentations have (1) first end portions which, with the first end of the central tubing portion, axially locks the seat member within the central tubing portion, (2) second end portions that combinatively form an axial stop for the ball, and (3) main body portions that combinatively form within the central tubing portion a track structure that axially guides the ball between its closed position against the seating surface and its open position against the axial stop. When the ball is in its open position against the axial stop, refrigerant flows through the interior of the valve seating member and then around the ball via circumferentially spaced, axially extending fluid bypass passages positioned between the tubing side wall indentations.

16 Claims, 1 Drawing Sheet

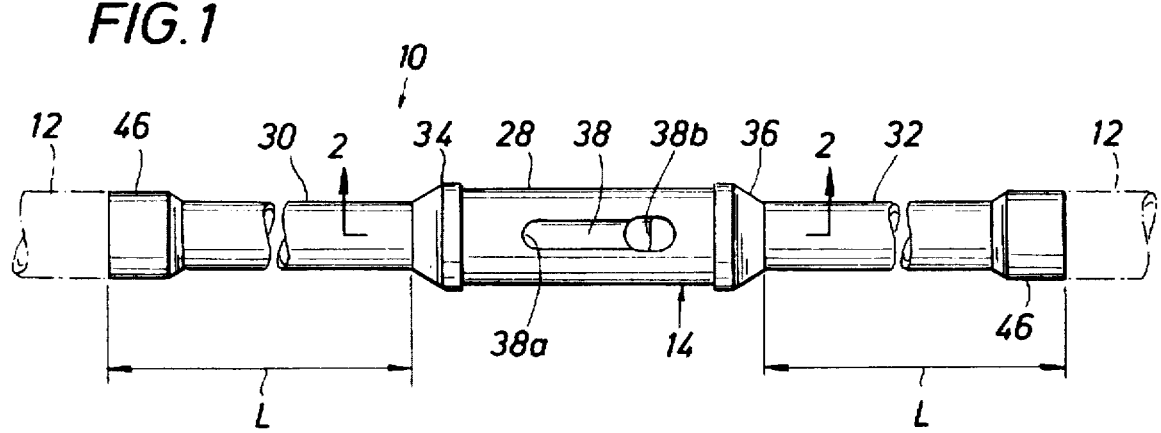
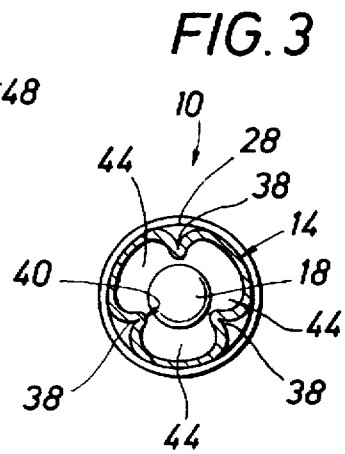
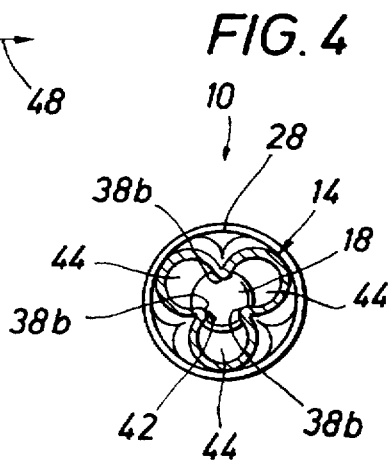

TUBULAR REFRIGERANT CHECK VALVE WITH IDENTED OUTER HOUSING PORTION

BACKGROUND OF THE INVENTION

The present invention generally relates to valves and, in a preferred embodiment thereof, more particularly relates to an improved refrigerant check valve.

Various types of check valve structures have been previously proposed for installation in copper refrigerant lines connected to, for example, indoor and outdoor coil portions of air conditioning and heat pump units. In this particular flow direction control application, desirable performance characteristics of the check valve include low leakage ratio, small pressure drop, large flow ratio, high working pressure capacity, and low operating noise. From a construction standpoint it is also desirable that the valve be rugged and durable, relatively inexpensive to manufacture and assemble, and be able to withstand relatively high temperatures.

One previous approach to meeting at least some of these performance and construction goals is to captively retain a valve cage structure and associated shutoff ball element in an outer copper tubing member which serves as the outer valve housing and may be appropriately soldered into the copper refrigerant line which the check valve is to serve in its flow direction control capacity. Two representative refrigerant check valves constructed in this general fashion are illustrated and described in U.S. Pat. No. 4,070,045 to Brandt, and U.S. Pat. No. 4,100,935 to Harnish.

While refrigerant check valves such as these tend to be generally satisfactory for their intended purpose, it would be desirable to provide a tubing-based refrigerant check valve structure having improvements in areas such as fabricational economy and simplicity, operational quietness, ruggedness, and heat resistance. It is accordingly an object of the present invention to provide such an improved refrigerant check valve.

SUMMARY OF THE INVENTION

In carrying out principles of the present invention, in accordance with a preferred embodiment thereof, an improved refrigerant check valve is inexpensively formed using only three components—(1) an elongated tubular body preferably defined by a continuous or axially segmented length of copper tubing, (2) an annular valve seat member having a conically tapered seating surface formed on an end portion thereof, and having a small tap angle of from about eighteen degrees to about twenty degrees, and (3) a closure member, preferably a nonmetallic closure ball formed from a nylon or plastic material.

The tubular body preferably has a longitudinally central portion positioned between two elongated opposite spun-down end portions having reduced diameters and joined to the longitudinally central portion at radially sloping transition portions of the body. The valve seat member is coaxially received and axially locked within an end of the longitudinally central body portion, and the ball is received in the longitudinally central body portion for axial movement therein toward and away from the seating surface on the valve seat member.

According to a key feature of the invention, side wall indentations are formed in the central longitudinal portion of the tubular body and define therein (1) a track structure operative to guide the ball during axial movement thereof between a closed position in which the ball sealingly engages the seating surface, and an open position in which the ball is axially spaced apart from the seating surface; (2) a stop structure operative to engage the ball in its open position and preclude further axial movement of the ball away from the seating surface; and (3) fluid passages disposed between the indentations and operative, when the ball is in its open position, to permit fluid flow through the tubular body away from the seating surface and then outwardly around the ball.

Representatively, the indentations are three axially elongated, circumferentially spaced side wall indentations having first ends that, with one of the radially sloped transition portions of the tubular body, axially lock the valve seat member within the tubular body, elongated main portions that combinatively define the track structure and are disposed between the aforementioned fluid bypass passages, and radially inset second ends that combinatively define the stop structure and are disposed in a circle having a diameter less than that of the closure ball.

The outer ends of the reduced diameter opposite end portions of the tubular body are preferably flared to facilitate the soldering of the body into a copper refrigerant line. To protect the nonmetallic closure ball from damage from the soldering process heat, the opposite reduced diameter tubular body end portions are substantially longer than the axial distance between the valve seat member and the stop structure. Preferably, the lengths of these opposite reduced diameter end portions are approximately twice the axial distance between the valve seat member and the stop structure.

Despite its simplicity and relatively low cost however, the check valve has the desirable operating characteristics of quiet functioning (due to the nonmetallic ball) in both steady state and transient operation modes, low pressure drop, high flow ratio, high maximum working pressure, and low opening pressure. While the check valve is representatively illustrated as being utilized in a refrigerant circuit application, it will be readily appreciated by those of skill in this particular art that it could also be advantageously used in a variety of other fluid flow control applications if desired.

BRIEF DESCRIPTION OF THE DRAWINGS

FIG. 1 is a side elevational view of a tubular refrigerant check valve embodying principles of the present invention;

FIGS. 2A and 2B are enlarged scale partial cross-sectional views through the valve, taken along line 2—2 of FIG. 1, and respectively illustrate the valve in its closed and open positions;

FIG. 3 is a cross-sectional view through the valve taken along line 3—3 of FIG. 2A; and FIG. 4 is a cross-sectional view through the valve taken along line 4—4 of FIG. 2A.

DETAILED DESCRIPTION

As illustrated in FIGS. 1–4, the present invention provides a specially designed, generally tubular check valve 10 that may be coaxially installed in a copper refrigeration line 12 of, for example, an air conditioning or heat pump circuit to automatically permit refrigerant flow through line 12 in a selected direction while precluding flow therethrough in the opposite direction. The check valve 10 is of an extremely simple construction, consisting of only three parts—(1) an elongated tubular outer body portion 14 preferably defined by a continuous or (as shown) axially segmented length of copper tubing, (2) an annular brass valve seat member 16, and (3) a nonmetallic closure ball member 18 preferably formed of a plastic or nylon material.

As viewed in FIGS. 2A and 2B, the valve seat member 16 has a left or outer end 20, a right or inner end 22, a circularly cross-sectioned axial flow passage 24 opening outwardly through the ends 20 and 22, and a conically tapered valve seating surface 26 interiorly formed in a right or inner end portion of the seat member. Preferably, the valve seating surface 26 has a small tap angle A of approximately eighteen to twenty degrees.

The valve seat member 16 and the closure ball 18 are captively retained within a longitudinally central portion 28 of the valve body 14 positioned between elongated opposite left and right end portions 30, 32 of the body 14 which are spun down to provide them with reduced diameters and are respectively separated from the central portion 28 by sloping side wall transition portions 34, 36 of the tubular body 14. As representatively illustrated, the central body portion 28 is separate from the elongated end portions 30 and 32. However, as previously mentioned herein, the overall tubular outer body 14 could alternatively be formed from a single continuous length of copper tubing if desired. Formed in the central body portion 28 are three circumferentially spaced, axially elongated indentations 38 each having a left end portion 38a, a radially deeper right end portion 38b, and a main body portion longitudinally extending between the left and right end portions 38a, 38b.

As best illustrated in FIGS. 2A and 2B, the annular valve seat member 16 is axially locked between the annular left valve body transition area 34 and the circumferentially spaced left indentation end portions 38a. In addition to cooperating with the transition area 34 to axially lock the valve seat member 16 in place within the central valve body portion 28, the indentation portions 38 of the tubular valve body 14 perform three other functions.

First, the three circumferentially spaced indentations 38 combinatively form within the valve body interior a ball track structure 40 which serves to axially guide the ball 18 between its subsequently described closed and open positions as respectively illustrated in FIGS. 2A and 2B. Second, the radially inset right indentation end portions 38b combinatively form within the interior of the central valve body portion 28, in a rightwardly spaced relationship with the valve seat member 16, a ball end stop structure 42, with the indentation end portions 38b being arranged in a circle having a diameter smaller than that of the ball 18. Third, the indentations 38 form therebetween three axially extending, circumferentially spaced fluid ball bypass passages 44 as can be best seen in FIGS. 3 and 4.

In the assembled refrigerant check valve 10 shown in FIG. 1, the left and right elongated body end portions 30 and 32 are each substantially longer than the length of the internal valve structure—i.e., the length between the left end 20 of the valve seat member 16 and the right indentation end portions 38b. Preferably, each of these valve body end portions 30 and 32 has a length L which is approximately two times the length of such internal valve structure. The outer ends of the elongated spun-down body end portions 30, 32 are suitably flared, as at 46, to facilitate their solder connection to facing end portions of the refrigerant line 12 shown in FIG. 1.

During operation of the refrigerant check valve 10, when refrigerant 48 attempts to flow leftwardly through the valve 10 (see FIGS. 2A and 3), the initial refrigerant flow leftwardly drives the ball 18 along the tubing-defined axial ball track structure 40 into sealing engagement with the conically tapered valve seat surface 26 to preclude further fluid flow leftwardly through the valve seat member flow passage 24.

A subsequent rightward flow of refrigerant 48 through the valve 10, as shown in FIG. 2B, drives the ball 18 rightwardly off the valve seat 26 and along the track structure 40 until the ball 18 engages and is stopped by the stop structure 42. With the valve 10 in this open position thereof, flows 48a of refrigerant rightwardly bypass the stopped ball 18 and travel through the circumferentially spaced bypass passages 44 (see also FIG. 4) and into the right valve body end portion 32.

As can be seen, the check valve 10 is of a very simple construction, having only three parts, and may be quickly and relatively inexpensively assembled. Despite its simplicity and low cost, however, the valve 10 has the desirable operating characteristics of quiet functioning (due to the nonmetallic ball 18) in both steady state and transient operation modes, low pressure drop, high flow ratio, high maximum working pressure, and low opening pressure.

Additionally, the incorporation of the elongated body end portions 30, 32 into the finished check valve protects the nonmetallic ball 18 and the valve seat 26 from excess heat which might otherwise be transmitted thereto during soldering of the valve body ends 46 to the associated sections of the refrigerant line 12. While the check valve 10 has been illustrated as being utilized in a refrigerant circuit application, it will be readily appreciated by those of skill in this particular art that it could also be advantageously used in a variety of other fluid flow control applications if desired.

The foregoing detailed description is to be clearly understood as being given by way of illustration and example only, the spirit and scope of the present invention being limited solely by the appended claims.

What is claimed is:

1. A check valve comprising:
    an outermost tubular body;
    an annular valve seat member coaxially retained in said outermost tubular body and having a seating surface formed on an end portion thereof;
    a closure member received in said outermost tubular body in a facing relationship with said seating surface; and
    side wall indentations formed in said outermost tubular body and defining therein:
    (1) a track structure operative to guide said closure member during axial movement thereof between a closed position in which said closure member sealingly engages said seating surface, and an open position in which said closure member is spaced apart from said seating surface,
    (2) a stop structure operative to engage said closure member in said open position thereof and preclude further axial movement of said closure member away from said seating surface, and
    (3) fluid passages disposed between said indentations and operative, when said closure member is in said open position thereof, to permit fluid flow through said outermost tubular body away from said seating surface and then outwardly around said closure member.

2. The check valve of claim 1 wherein said check valve is a refrigerant check valve.

3. The check valve of claim 1 wherein said closure member is a ball formed from a nonmetallic material.

4. The check valve of claim 3 wherein said ball is of a plastic material.

5. The check valve of claim 3 wherein said ball is of a nylon material.

6. The check valve of claim 1 wherein said seating surface is a conically tapered seating surface.

7. The check valve of claim 6 wherein said conically tapered seating surface has a tap angle within the range of from about eighteen degrees to about twenty degrees.

8. A check valve comprising:

an elongated tubular body;

an annular valve seat member coaxially retained in said tubular body and having a seating surface formed on an end portion thereof;

a closure member received in said tubular body in a facing relationship with said seating surface; and side wall indentations formed in said tubular body and defining therein:

(1) a track structure operative to guide said closure member during axial movement thereof between a closed position in which said closure member sealingly engages said seating surface, and an open position in which said closure member is spaced apart from said seating surface, (2) a stop structure operative to engage said closure member in said open position thereof and preclude further axial movement of said closure member away from said seating surface, and (3) fluid passages disposed between said indentations and operative, when said closure member is in said open position thereof, to permit fluid flow through said tubular body away from said seating surface and then outwardly around said closure member, said elongated tubular body having a longitudinally central portion, and elongated, reduced diameter opposite end portions, said valve seat member and said closure ball being disposed in said longitudinally central body portion, and said side wall indentations being formed in said longitudinally central body portion.

9. The check valve of claim 8 wherein said elongated tubular body is formed from at least one length of copper tubing.

10. The check valve of claim 9 wherein said opposite tubular body end portions have flared outer ends.

11. The check valve of claim 8 wherein said reduced diameter opposite end portions of said tubular body are spun-down opposite end portions thereof.

12. The check valve of claim 8 wherein:

said closure member is a closure ball, and said side wall indentations include a circumferentially spaced plurality of axially elongated indentations having first ends adjacent the seating surface end portion of said valve seat member, longitudinal body portions defining said track structure, and radially inset second ends disposed in a circle having a diameter less than that of said closure ball and defining said stop structure.

13. The check valve of claim 12 wherein there are three of said circumferentially spaced side wall indentations.

14. The check valve of claim 12 wherein:

said tubular body has radially sloped transition portions interposed between said longitudinally central portion of said tubular body and said reduced diameter opposite end portions thereof, and said valve seat member is axially locked between one of said transition portions and said first ends of said side wall indentations.

15. The check valve of claim 8 wherein the length of each of said reduced diameter opposite end portions is substantially greater than the axial distance between said valve seat member and said stop structure.

16. The check valve of claim 15 wherein the length of each of said reduced diameter opposite end portions is approximately twice the axial distance between said valve seat member and said stop structure.

* * * * *